W. S. THOMSON.
END CUTTING PLIERS.
APPLICATION FILED FEB. 4, 1915.
1,192,021.
Patented July 25, 1916.
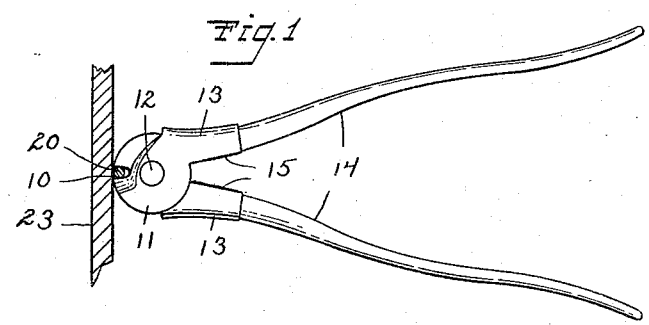
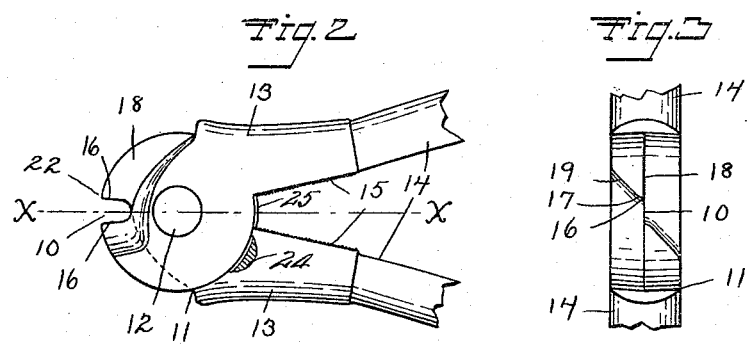 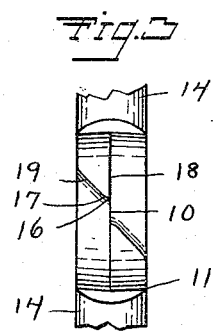
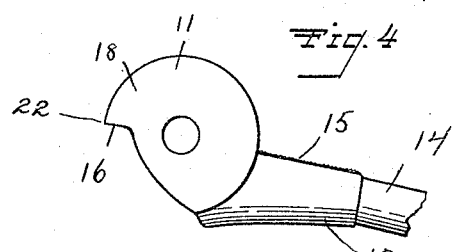
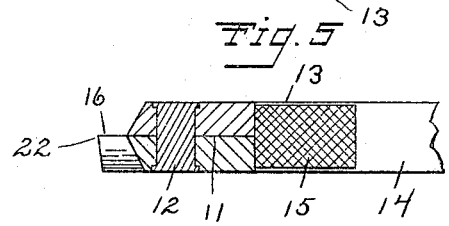
Witnesses:
R. W. Edwards
J. A. Hall
Inventor:
William S. Thomson.
By Louis M. Schmidt
Atty.

UNITED STATES PATENT OFFICE.

WILLIAM S. THOMSON, OF PLANTSVILLE, CONNECTICUT, ASSIGNOR TO THE H. D. SMITH & COMPANY, OF PLANTSVILLE, CONNECTICUT.

END-CUTTING PLIERS.

1,192,021.   Specification of Letters Patent.   Patented July 25, 1916.

Application filed February 4, 1915. Serial No. 6,067.

*To all whom it may concern:*

Be it known that I, WILLIAM S. THOMSON, a citizen of the United States, residing at Plantsville, in the county of Hartford and State of Connecticut, have invented certain new and useful Improvements in End-Cutting Pliers, of which the following is a specification.

My invention relates to improvements in end cutting pliers, and the object of my improvement is to produce a pair of cutting pliers suitable for cutting wire when positioned close to or along-side an abutment or obstruction, such as wire used on the outside of a packing case or box for reinforcing the same, or the wire of a wire fence in abutment with the face of the fence post, and for which purpose I find pliers such as described herewith to be especially adapted, being so constructed as to be brought end on to the work, having short, stubby jaws, the extreme ends of the jaws being suitable for being in bearing engagement with the obstruction during the cutting and having cutting edges extending to the said extreme ends of the jaws.

In the accompanying drawing:—Figure 1 is a side elevation of my improved end cutting pliers in position for use in cutting a wire close to a board, the wire being shown in section. Fig. 2 is a similar view on an enlarged scale of the pliers, the handles being omitted. Fig. 3 is an end elevation of the same. Fig. 4 is a side elevation of the rear member shown in Fig. 2. Fig. 5 is a sectional view on the line $x\ x$ of Fig. 2.

My end cutting pliers comprise a pair of similar members having jaws 10 at one end and handles 14 at the other end and pivotally connected intermediate the said ends by means of a pin 12. The said members comprise each the handle 14, a shank 13 adjacent the said handle, and a head 11 at the end of the shank remote from the handle in which the pivotal pin 12 is positioned. The head extends from one side of the shank 13 being formed by reducing the thickness of the material of which it is formed to about one half that of the said shank 13, the inner face 18 being in the form of a flat bearing surface, suitable for coöperating with the corresponding flat bearing surface 18 on the mating member. At the junction of the flat bearing surface 18 and the shank 13 there is a shoulder 24, at the end of the shank 13.

The head 11 has a generally circular, though actually, as shown in Fig. 3 at 25, slightly conical periphery, concentric with the pivotal axis, except adjacent the jaw 10, where it is cut away, suitably to form the said jaw 10, the latter being positioned inwardly from the general contour of the said periphery.

The shoulder 24 at the junction of the flat bearing surface 18 and the shank 13 is conical, and is an operative fit for the conical periphery 25 of the mating member with which it engages. That is to say, the said shoulder on one member and the periphery of the other member coöperate as bearing surfaces in conjunction with the pivotal connection provided by the pin 12 as a fulcrum during the cutting operation when the jaws 10 are engaged with a wire 20 to be cut thereby.

The cutting edges 16 of the jaws 10 are directed generally radially, and extend inwardly from the outer corners 22 for a distance slightly greater than the diameter of the wire 20 for which the pliers are adapted, and from the base of the jaws 10 the material of the head is cut away to the junction of the head 11 with the outer lateral portion of the shank 13. The corners 22, formed by the conical periphery of the head 11 and the radial edges 16 of the jaws 10, are suitable for engaging with a post or board 23 during the cutting operation, as for cutting a wire positioned in abutment with the said post or board.

The cutting edges 16 are V-shaped, being formed by the flat bearing face 18 on one side and the inclined outer face 17, and outwardly from the said first inclined face 17 there is an inclined clearance face 19, which has an appreciably greater inclination to the flat bearing face 18.

The inner opposed faces 15 of the shanks 13 are roughened suitably to be used as pinching jaws.

The form of jaws provided is found to be especially effective in cutting under severe conditions, as for cutting heavy wire or nails, and because of their form, are readily sharpened with ordinary tools, as will be noted from an inspection of Fig. 3.

The entire tool as described is suited for heavy duty and for operating in close quarters, in which the work is inaccessible to a tool built on the usual lines. The jaws are short and stubby, being limited in length to the capacity for which they are adapted, and they are well supported by the other constructive features, as described.

The feature of having the coöperating bearing surfaces of the periphery of the head portion of one member and the shoulder on the shank portion of the other member conical, as shown in Fig. 3, provides an inclined bearing surface which in operation as a fulcrum serves to hold the bearing surfaces 18 in engagement, as because of the inclined plane effect there is a tendency under pressure for the heads 11 to slide together, and thus to maintain the bearing surface in contact.

I claim as my invention:—

A pair of pliers composed of a pair of mating members having overlapping portions pivotally connected by means of a pin, the said members being similar and comprising each a body portion engaged with the said pin of generally circular form having a bearing surface on the inner face, a shank connected to the said body portion and of greater thickness than the said body portion suitably to provide a shoulder at the junction with the said body portion extending outwardly from the said bearing surface, the said shoulder being concentric with the said pin and engaged with the opposed periphery of the body portion of the mating member, and the said shoulder being slightly conical so as to overhang the said bearing surface and the opposed periphery being also conical to fit the same, whereby a slightly conical bearing engagement will be provided for the periphery of each of the members with the shoulder provided on the shank of the mating member.

WILLIAM S. THOMSON.

Witnesses:
 GEO. R. BOND,
 E. H. GALPEN.

Copies of this patent may be obtained for five cents each, by addressing the "Commissioner of Patents, Washington, D. C."